United States Patent
Ganser et al.

(10) Patent No.: US 7,859,758 B2
(45) Date of Patent: Dec. 28, 2010

(54) DEVICE FOR HOMOGENIZING LIGHT

(75) Inventors: Heiko Ganser, Dortmund (DE); Thomas Mitra, Dortmund (DE)

(73) Assignee: Limo Patentverwaltung GmbH & Co. KG, Gerstengrund (DE)

( * ) Notice: Subject to any disclaimer, the term of this patent is extended or adjusted under 35 U.S.C. 154(b) by 334 days.

(21) Appl. No.: 12/058,220

(22) Filed: Mar. 28, 2008

(65) Prior Publication Data

US 2009/0296222 A1    Dec. 3, 2009

Related U.S. Application Data

(63) Continuation of application No. PCT/EP2005/010587, filed on Sep. 30, 2005.

(51) Int. Cl.
*G02B 27/10*    (2006.01)
(52) U.S. Cl. .................................... 359/622
(58) Field of Classification Search .......... 359/619–623
See application file for complete search history.

(56) References Cited

U.S. PATENT DOCUMENTS 3,484,599 A   12/1969   Little
7,085,062 B2   8/2006   Hauschild
7,508,588 B2*   3/2009   Nakajima ................... 359/619
2004/0042085 A1   3/2004   Hough
2008/0002261 A1*   1/2008   Hill et al. ................... 359/619

FOREIGN PATENT DOCUMENTS

EP    0490171 A2   6/1992
EP    1489438 A1   12/2004
WO   2005017601 A1   2/2005

OTHER PUBLICATIONS

International Search Report, dated Nov. 30, 2005.

* cited by examiner

*Primary Examiner*—Alicia M Harrington
(74) *Attorney, Agent, or Firm*—Laurence A. Greenberg; Werner H. Stemer; Ralph E. Locher

(57) ABSTRACT

A device for homogenizing light has a first lens array provided with a number of convex lenses, and at least one second lens array disposed at a distance from the first lens array in the beam scattering direction and through which the light refracted by the first lens array can pass. The second lens array is formed with a number of first lenses that are respectively arranged at a distance from each other. At least one of the first lenses of the second lens array is associated with each convex lens of the first lens array. The convex lenses of the first lens array have a smaller curvature than the first lenses of the second lens array associated with said convex lenses.

10 Claims, 1 Drawing Sheet

US 7,859,758 B2

DEVICE FOR HOMOGENIZING LIGHT

CROSS-REFERENCE TO RELATED APPLICATION

This is a continuing application, under 35 U.S.C. §120, of copending international application No. PCT/EP2005/010587, filed Sep. 30, 2005,which designated the United States; the prior application is herewith incorporated by reference in its entirety.

BACKGROUND OF THE INVENTION

Field of the Invention

The present invention relates to a device for homogenizing light, comprising a first lens array, having a number of convex lenses, and at least one second lens array, arranged at a distance from the first lens array in the direction of beam propagation, through which the light refracted by the first lens array can pass, the second lens array having a number of first lenses, which are in each case arranged at a distance from each other by an intermediate space, at least one of the first lenses of the second lens array being assigned to each convex lens of the first lens array.

Devices of the type mentioned initially are used, for example, to homogenize the relatively inhomogeneous laser light emitted by a laser diode bar. The light emerging from such a device, which is refracted by the individual lenses of the lens arrays, is homogenously distributed over an angular range. The devices for homogenizing light known from the prior art are produced with relatively small or intermediate numerical apertures. Typical values for the numerical aperture are of an order of magnitude of between approximately 0.01 and 0.35. In particular, the devices for homogenizing light known from the prior art are used for even illumination of a work area, for example in material machining, microlithography or metrology. However, the numerical apertures achievable with the known devices for homogenizing light are not sufficient for some areas of application.

BRIEF SUMMARY OF THE INVENTION

The present invention is therefore based on the object of providing a device for homogenizing light, which can achieve a relatively large numerical aperture with a relatively small effort, even with materials of a comparatively low refractive index.

This object is achieved by a device for homogenizing light having the features of claim 1. The subclaims relate to advantageous developments of the invention.

In accordance with the invention, it is proposed that the convex lenses of the first lens array have a smaller curvature than the first lenses of the second lens array assigned to them. As a result of this, the laser light incident on the inventive device for homogenizing light is refracted at the more weakly curved convex lenses of the first lens array and is then incident on the first lenses of the second lens array which are curved more strongly than the lenses of the first lens array. Thus, with aid of the inventive device, relatively large numerical apertures can be achieved with little effort, even with materials of a comparatively low refractive index. By changing the curvature of the convex lenses of the first lens array and of the first lenses of the second lens array assigned to them, the numerical aperture can be adapted systematically.

In a preferred embodiment, it is provided that in the direction of beam propagation the vertex lines of the convex lenses of the first lens array are substantially aligned with the vertex lines of the first lenses of the first lens array. The alignment of the two lens arrays relative to each other can thus be optimized.

It is possible that at least a proportion of the first lenses of the second lens array are convex. In this case it can also be provided for all of the first lenses of the second lens array to be convex.

Alternatively, or in addition, it is also possible that at least a proportion of the first lenses of the second lens array are concave. In this case it can also be provided for all of the first lenses of the second lens array to be convex. The second lens array is then arranged behind the focal plane of the first lens array.

In an advantageous embodiment, it is proposed that in each case an intermediate space is formed between two adjacent convex lenses of the first lens array.

It is possible that in the direction in which the convex lenses of the first lens array are arranged next to each other, the convex lenses of the first lens array have a greater width than the intermediate spaces. As a result of this, it is possible to achieve that a substantial proportion of the laser light to be homogenized passes through the convex lenses and is refracted by them.

In principle, the intermediate spaces between the lenses of the first lens array can have an arbitrary shape. To simplify production of the device, an advantageous embodiment provides for the intermediate spaces between the convex lenses of the first lens array to be formed such that the transition to the adjacent convex lenses is continuous.

In a particularly preferred embodiment, the intermediate spaces can at least partially comprise concave lenses.

In an advantageous embodiment, the radii of curvature of the first lenses of the second lens array can be formed such that the focal points of the lenses lie within the second substrate.

It is possible that the intermediate spaces between the first lenses of the second lens array are second lenses which have different forms than the first lenses.

In an advantageous embodiment, it can be provided that the second lenses have a larger radius of curvature than the first lenses of the second lens array.

By way of example, the second lenses can be of concave design.

BRIEF DESCRIPTION OF THE DRAWING

Further features and advantages of the present invention are clarified by means of the following description of a preferred exemplary embodiment with reference to the attached figure, in which a very simplified schematic side view of an inventive device for homogenizing light is illustrated. To simplify the following description, a Cartesian coordinate system is plotted in FIG. 1.

DESCRIPTION OF THE INVENTION

Figure 1:
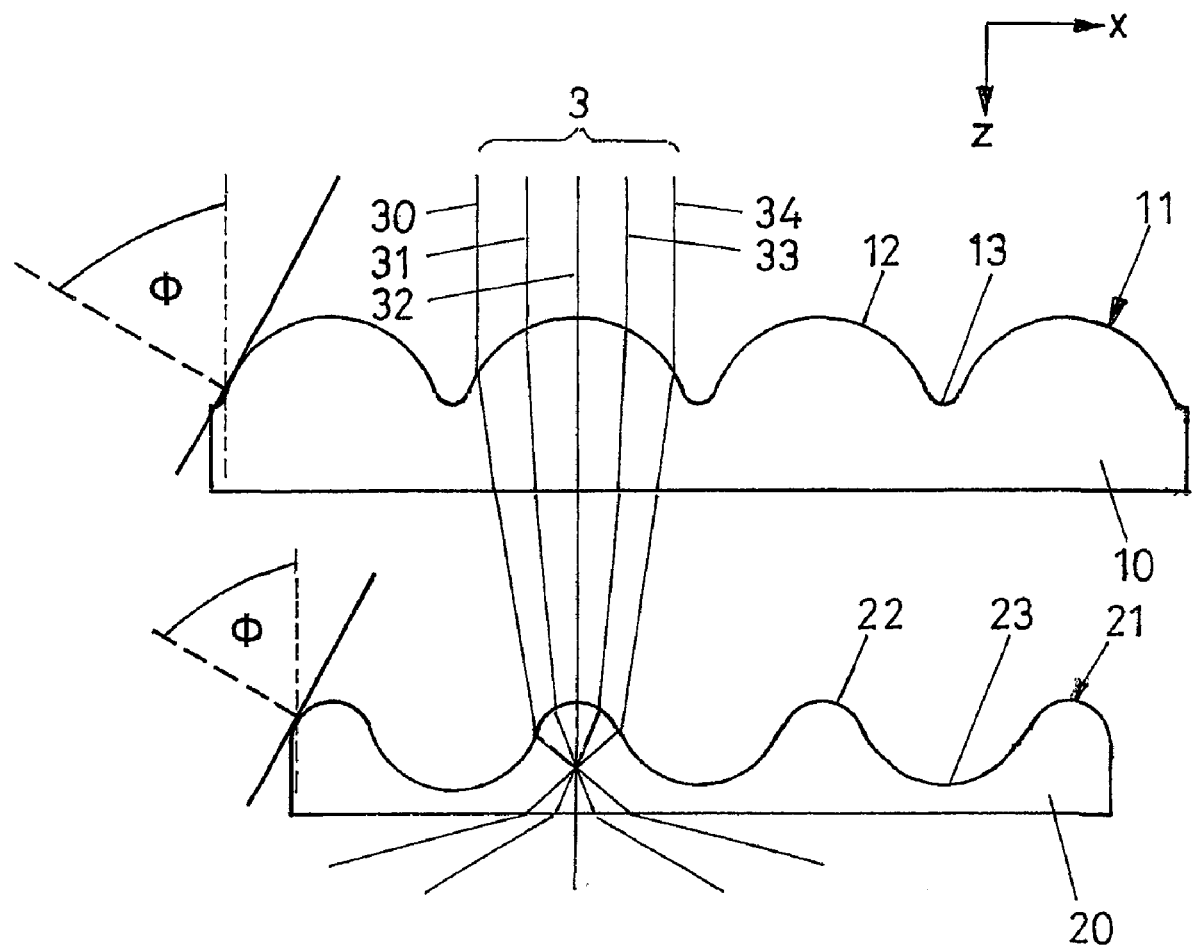

The exemplary embodiment of an inventive device for homogenizing light shown in FIG. 1 has a first substrate 10 and a second substrate 20. It can be seen that the first substrate 10 has a first lens array 11 on a light entry surface. By contrast, the light exit surface is planar or at least substantially planar. The first lens array 11 has a number of convex lenses 12 and a number of concave lenses 13. In this exemplary embodiment, the convex lenses 12 and the concave lenses 13 are cylindrical lenses, whose cylinder axes are substantially oriented parallel to each other. It can be seen that in the x-direction the convex lenses 12 and the concave lenses 13 of the first lens array 11 are arranged next to each other in alternating fashion. Hence, the concave lenses 13 form intermediate spaces between the individual convex lenses 12 of the first lens array 11. In principle, a multiplicity of convex and concave lenses 12, 13 can be arranged next to each other in the x-direction. The convex lenses 12 of the first lens array 11 have a larger extent in the x-direction, and hence a greater width, than the concave lenses 13. Alternatively, instead of the concave lenses 13, it is also possible to provide an intermediate space with a different design between the individual convex lenses 12. These intermediate spaces have a smaller extent, preferably a substantially smaller extent, in the x-direction than the convex lenses 12. In principle, the intermediate spaces between the convex lenses 12 can have an arbitrary shape. From a manufacturing point of view, the only requirement is to have a transition between an intermediate space and both adjacent convex lenses 12, which delimit the intermediate space, which is—mathematically—continuously differentiable.

In an alternative embodiment, which is likewise not explicitly shown here, it is possible to likewise provide the light exit surface of the first substrate 10 with a further lens array. By way of example, this lens array can have a number of cylindrical lenses with cylinder axes which can be oriented perpendicular to the cylinder axes of the cylindrical lenses of the first lens array 11.

The second substrate 20, which is at a distance from the first substrate 10 in the direction of beam propagation (z-direction), has a second lens array 21 on a light entry surface which faces the light exit surface of the first substrate 10. In this exemplary embodiment, the light exit surface of the second lens array 21 is likewise planar or at least substantially planar. It can be seen that the second lens array 21 has convex first lenses 22 and concave second lenses 23; in this exemplary embodiment, the lenses are likewise cylindrical lenses, whose cylinder axes are oriented parallel to each other. In the x-direction, the convex lenses 22 and the concave lenses 23 of the second lens array 21 are likewise arranged next to each other in alternating fashion. However, as opposed to the first lens array 11, the convex lenses 22 of the second lens array 21 have a smaller extent in the x-direction and thus have a smaller width than the concave lenses 23. It can also be provided that in place of the concave lens 23 an intermediate space, which in principle can have an arbitrary shape, is provided in each case between the individual convex lenses 22. From a manufacturing point of view, the only requirement is to have a transition between the intermediate space and both adjacent convex lenses 22 which is—mathematically—continuously differentiable. The intermediate spaces between the convex lenses 22 then have a smaller extent, preferably a substantially smaller extent, in the x-direction than the concave lenses 23.

In an alternative embodiment, it is also possible to likewise provide the light exit surface of the second substrate 20 with a lens array which, by way of example, can comprise a number of cylindrical lenses whose cylinder axes can be oriented perpendicular to the cylinder axes of the cylindrical lenses of the second lens array 21.

In this exemplary embodiment, it can be seen that in the direction of beam propagation (z-direction), the vertex lines of the convex lenses 12 of the first lens array 11 are aligned with the vertex lines of the convex lenses 22 of the second lens array 21. In the direction of beam propagation, the vertex lines of the concave lenses 13 of the first lens array 11 are likewise aligned with the vertex lines of the concave lenses 23 of the second lens array 21. Hence, each convex lens 12 of the first lens array 11 has a convex lens 22 of the second lens array 21 assigned to it. In this exemplary embodiment, each concave lens 13 of the first lens array 11 likewise has a concave lens 23 of the second lens array 21 assigned to it.

To clarify the mode of operation of the device for homogenizing light shown here, FIG. 1 plots a total of five partial beams 30, 31, 32, 33, 34 of a light beam 3 to be homogenized emanating from a light source which is not explicitly displayed here and which can, for example, be a laser light source (in particular, a laser diode bar or an excimer laser). The light beam 3, which is substantially parallel in the example shown here but can, in principle, also be divergent, enters the device for homogenizing light at the light entry surface of the first lens array 11, is refracted by one of the convex lenses 12 of the first lens array 11, and exits the first substrate 10 at the latter's light exit surface. The partial beams 30, 31, 32, 33, 34 are focused onto the light entry surface of the second lens array 21.

As has been mentioned above, the convex lenses 22 of the second lens array 21, which are assigned to the convex lenses 12 of the first lens array 11, have a larger curvature with a smaller radius of curvature and a smaller extent in the x-direction than the convex lenses 12 of the first lens array 11 and, in this exemplary embodiment, image the partial beams 30, 31, 32, 33, 34 at a focal point when the beams pass through the second lens array 21, as shown in FIG. 1. In this exemplary embodiment, the focal point is inside the second substrate 20. When the partial beams 30, 31, 32, 33, 34 exit the second substrate 20, they are refracted one more time at the light exit surface such that a homogeneous, substantially linear area with a relatively large width is generated at a certain distance behind the second substrate 20 in a work area of the device for homogenizing light. In principle it is also possible that the partial beams 30, 31, 32, 33, 34 are not imaged at a common focal point. Furthermore, it is also possible that the beam waist lies outside the second substrate 20.

The device for homogenizing light shown here can for instance be used in material machining processes, in which linear areas, which are relatively extended in length, are to be illuminated with the laser light from a relatively short working distance.

As already mentioned, it is also possible in principle that the intermediate spaces between the convex lenses 22 of the second lens array 21 can have an arbitrary shape since no light falls into these intermediate spaces on account of the geometric relationships prevailing in the device shown here. However, it is in principle also possible to design the intermediate spaces between the convex lenses 22 of the second lens array 21 such that light passing through these intermediate spaces can likewise be used to homogenize the laser light 3. Due to the production processes which can be used to produce the lens arrays 11, 21, it is in general not possible to design the lens arrays 11, 21 with a quasi-arbitrary depth in the z-direction. The tangents, which are assigned to the respectively steepest flanks of the convex lenses 12, 22, would then be much too steep. The tangents at the steepest location of the convex lenses 12, 22 are illustrated in FIG. 1. At an angle of $\phi=40°$ and with a refractive index of glass of $n=1.5$, this results in a value of approximately 0.9 for the numerical aperture of the device for homogenizing light shown here. By way of example, the depth of the convex lenses 12 of the first lens array 11 can then be approximately 0.395 mm in the z-direction. The width of the convex lenses 22 of the second lens array 21 can then be of an order of magnitude of approximately 0.2 mm. Trials have shown that in the case of a tangent angle $\phi$ of approximately 30° to 40°, a numerical aperture (NA) of almost 1 can be achieved with the aid of the device shown here. With the aid of the device shown here, comparatively large numerical apertures can also be achieved with substrates 10, 20 which have a relatively low refractive index.

In order to obtain the most homogeneous light distribution as possible of the laser light 3 in the work area of the device, it can also be necessary in certain circumstances to design the convex lenses 12, 22 of the first and second lens array 11, 21 aspherically.

In accordance with a variant of the device for homogenizing light shown in FIG. 1, which is not explicitly illustrated here, it is also possible to replace the second lens array 21 by a lens array which has concave lenses which are assigned to the convex lenses 12 of the first lens array 11. The second lens array 21 is then arranged behind the focal point of the first lens array 11.

By way of example, it is possible in principle to design the lenses 12, 13, 22, 23 of both lens arrays 11, 21 as round lenses (with intermediate spaces), as rectangular lenses or else as hexagonal lenses in place of cylindrical lenses. The basic idea of the invention is thus not restricted to a specific type of lens.

Furthermore, it is also possible to construct the device for homogenizing light from more than two lens arrays 11, 21. In addition, all lenses 12, 13, 22, 23 can be asymmetrical with respect to a mirror plane (y-z plane).

With the aid of the device for homogenizing light shown here, it is possible in principle to achieve relatively large numerical apertures of the order of magnitude 1. In particular, these values of the numerical aperture can also be achieved with little effort using this arrangement, with the aid of low refractive materials.

The invention claimed is:

1. A device for homogenizing light, comprising:
a first lens array having a plurality of convex lenses;
at least one second lens array disposed at a spacing distance from said first lens array in a direction of beam propagation, wherein light refracted by said first lens array passes through said second lens array, said second lens array having a plurality of first lenses disposed at a distance from one another and second lenses disposed in between, said second lenses having a greater radius of curvature than said first lenses of said second lens array;
each of said convex lenses of said first lens array having at least one of said first lenses of said second lens array assigned thereto; and
said convex lenses of said first lens array having a smaller curvature than said first lenses of said second lens array assigned thereto.

2. The device according to claim 1, wherein said convex lenses of the first lens array have vertex lines substantially aligned, in the direction of beam propagation, with vertex lines of said first lenses of said second lens array.

3. The device according to claim 1, wherein at least a proportion of said first lenses of said second lens array is convex.

4. The device according to claim 1, wherein at least a proportion of said first lenses of said second lens array is concave.

5. The device according to claim 1, wherein in each case an intermediate space is formed between two mutually adjacent convex lenses of said first lens array.

6. The device according to claim 5, wherein, in a direction in which said convex lenses of said first lens array are arranged next to one another, said convex lenses of said first lens array have a greater width than said intermediate spaces.

7. The device according to claim 5, wherein said intermediate spaces between said convex lenses of said first lens array are formed with a continuous transition to the respectively adjacent convex lenses.

8. The device according to claim 5, wherein said intermediate spaces are formed at least partially of concave lenses.

9. The device according to claim 1, wherein said first lenses of said second lens array are formed with radii of curvature to form focal points of said first lenses to lie within a substrate of said second lens array.

10. The device according to claim 1, wherein said second lenses are concave lenses.

* * * * *